United States Patent
Yamamoto et al.

[11] Patent Number: 6,014,414
[45] Date of Patent: Jan. 11, 2000

[54] SYNCHRONIZATION-MESSAGE-BASED ACTIVE REFERENCE SWITCHING UNIT

[75] Inventors: Junji Yamamoto; Kazuhiko Hata; Yoshitaka Taki, all of Kanagawa, Japan

[73] Assignee: Fujitsu Limited, Kanagawa, Japan

[21] Appl. No.: 08/824,900

[22] Filed: Mar. 26, 1997

[30] Foreign Application Priority Data

Oct. 29, 1996 [JP] Japan .................................. 8-286498

[51] Int. Cl.$^7$ .................................................. H04L 7/00
[52] U.S. Cl. .................................................. 375/356
[58] Field of Search .................................. 375/356, 354, 375/357; 370/507, 508, 503; 364/184, 569; 307/269

[56] References Cited

U.S. PATENT DOCUMENTS 5,153,824  10/1992  Lalanne et al. .
5,706,291  1/1998  Kainulainen et al. .................. 375/356

FOREIGN PATENT DOCUMENTS 4-274633  9/1992  Japan .

*Primary Examiner*—Stephen Chin
*Assistant Examiner*—Albert Park
*Attorney, Agent, or Firm*—Helfgott & Karas, P C.

[57] ABSTRACT

A unit of the invention is installed in each of transmission units that make up a synchronous network. The unit selects from the clock references received an active reference that controls the operation of the corresponding transmission unit, based on the quality levels of clock references presented by synchronization messages received with the clock references. The clock references, each of which is selectable as the active reference, and their selection priorities are entered into a source priority list. By referencing the source priority list, the active reference is selected.

11 Claims, 20 Drawing Sheets

| FRAME NUMBER | FRAME BIT | | | |
|---|---|---|---|---|
| | NUMBER | FPS | CRC | DL |
| 1 | 0 | - | - | X |
| 2 | 193 | - | C1 | - |
| 3 | 386 | - | - | X |
| 4 | 579 | 0 | - | - |
| 5 | 772 | - | - | X |
| 6 | 965 | - | C2 | - |
| 7 | 1158 | - | - | X |
| 8 | 1351 | 0 | - | - |
| 9 | 1544 | - | - | X |
| 10 | 1737 | - | C3 | X |
| 11 | 1930 | - | - | - |
| 12 | 2123 | 1 | - | X |
| 13 | 2316 | - | - | - |
| 14 | 2509 | - | C4 | X |
| 15 | 2702 | - | - | - |
| 16 | 2895 | 0 | - | X |
| 17 | 3088 | - | - | - |
| 18 | 3281 | - | C5 | X |
| 19 | 3474 | - | - | X |
| 20 | 3667 | 1 | - | - |
| 21 | 3860 | - | - | X |
| 22 | 4053 | - | C6 | - |
| 23 | 4246 | - | - | X |
| 24 | 4439 | 1 | - | - |

FPS: Framing Pattern Sequence (...001011...)
CRC: Cyclic Redundancy check channel (bits C1 - C6)
DL: 4-kb/s Data Link X IS ASSIGNED TO DL

FIG. 3

| Transport Overhead | | | | Path Overhead |
| --- | --- | --- | --- | --- |
| Section Overhead | Framing A | Framing A2 | Trace/Growth (STS–ID) J0/Z0[a] | Trace J1 |
| | BIP-8 B1/Undefined[a] | Orderwire E1/Undefined[a] | User F1/Undefined[a] | BIP-8 B3 |
| | Data Com D1/Undefined[a] | Data Com D2/Undefined[a] | Data Com D3/Undefined[a] | Signal Label C2 |
| Line Overhead | Pointer H1 | Pointer H2 | Pointer Action H3 | Path Status G1 |
| | BIP-8 B2 | APS K1/Undefined[a] | APS K2/Undefined[a] | User Channel F2 |
| | Data Com D4/Undefined[a] | Data Com D5/Undefined[a] | Data Com D6/Undefined[a] | Indicator H4 |
| | Data Com D7/Undefined[a] | Data Com D8/Undefined[a] | Data Com D9/Undefined[a] | Growth Z3 |
| | Data Com D10/Undefined[a] | Data Com D11/Undefined[a] | Data Com D12/Undefined[a] | Growth Z4 |
| | Sync Status/Growth S1/Z1[a] | REI-L[b]/Growth M0 or M1/Z2[a] | Orderwire E2/Undefined[a] | Tandem Connection Z5 |

FIG. 4

| CONTENTS OF QUALITY LEVEL | ABBREVIATION | QUALITY LEVEL | DS1 ESF DATA LINK | S1 BYTE |
|---|---|---|---|---|
| Stratum 1 Traceable | PRS | 1 | 00000100111111111 | 0001 |
| Synchronization-Traceable Unknown | STU | 2 | 00001000111111111 | 0000 |
| Stratum 2 Traceable | ST2 | 3 | 00001100111111111 | 0111 |
| Stratum 3 Traceable | ST3 | 4 | 00010000111111111 | 1010 |
| +-20ppm Clock Traceable | SIC | 5 | 00100010111111111 | 1100 |
| Stratum 4 Traceable | ST4 | 6 | 00101000111111111 | — |
| Don't Use for Synchronization | DUS | 7 | 00110000111111111 | 1111 |
| Network Provider Specific Synchronization | RES | USER ASSIGN | 01000000111111111 | 1110 |

DS1 ESF DATA TRANSMISSION STARTS WITH RIGHTMOST BIT
S1 BYTE TRANSMISSION STARTS WITH LEFTMOST BIT

FIG. 5

| PRIORITY | REFERENCE |
|---|---|
| 1 | BITS INPUT PRIMARY |
| 2 | BITS INPUT SECONDARY |
| 3 | GROUP #1 WORK LINE |
| 4 | GROUP #1 PROTECTION LINE |
| 5 | GROUP #2 WORK LINE |
| 6 | GROUP #2 PROTECTION LINE |
| 7 | HOLD OVER CLOCK |

FIG. 10

| PRIORITY | Derived DS1 PRIMARY REFERENCE |
|---|---|
| 1 | GROUP #1 PROTECTION LINE |
| 2 | GROUP #1 WORK LINE |
| 3 | GROUP #2 WORK LINE |
| 4 | GROUP #2 PROTECTION LINE |
| 5 | INTERNAL CLOCK |

FIG. 12

| PRIORITY | Derived DS1 SECONDARY REFERENCE |
|---|---|
| 1 | BITS INPUT SECONDARY |
| 2 | BITS INPUT PRIMARY |
| 3 | GROUP #2 WORK LINE |
| 4 | GROUP #2 PROTECTION LINE |
| 5 | INTERNAL CLOCK |

FIG. 13

| PRIORITY | Derived DS1 PRIMARY REFERENCE |
|---|---|
| 1 | BITS INPUT PRIMARY |
| 2 | BITS INPUT SECONDARY |
| 3 | GROUP #1 WORK LINE |
| 4 | GROUP #1 PROTECTION LINE |
| 5 | INTERNAL CLOCK |

FIG. 15

| PRIORITY | Derived DS1 SECONDARY REFERENCE |
|---|---|
| 1 | BITS INPUT PRIMARY |
| 2 | BITS INPUT SECONDARY |
| 3 | GROUP #1 WORK LINE |
| 4 | GROUP #1 PROTECTION LINE |
| 5 | INTERNAL CLOCK |

FIG. 16

| PRIORITY | REFERENCE |
|---|---|
| 1 | BITS INPUT PRIMARY |
| 2 | GROUP #1 WORK LINE |
| 3 | GROUP #1 PROTECTION LINE |
| 4 | GROUP #2 WORK LINE |
| 5 | GROUP #2 PROTECTION LINE |
| 6 | INTERNAL CLOCK |

FIG. 18

SYNCHRONIZATION-MESSAGE-BASED ACTIVE REFERENCE SWITCHING UNIT

BACKGROUND OF THE INVENTION

1. Field of the Invention

The present invention relates to a technique of establishing clock synchronization in a synchronous network such as an optical communications network.

2. Description of the Related Art

A synchronous network environment exists which requires clock synchronization to be established over the whole network.

FIG. 1 shows an exemplary configuration of a synchronous network.

Transmission units 101 are interconnected by, for example, optical transmission lines 103 that conform to the SONET (Synchronous Optical Network) standards and are partly interconnected by, for example, DS1 metal transmission lines 104. Some of the transmission units 101 are connected to an exchange 105 directly or through repeaters 106.

In such a network environment, usually a clock generator 102, called a BITS (Building Integrated Timing Supply), is provided which provides a high-precision clock reference to the transmission units 101 within the network over the DS1 metal transmission lines 104.

Recently, as overhead information (control information) sent over the optical transmission lines 103 or the metal transmission lines 104, synchronization messages have been defined which are messages that indicate quality levels of various clock references input to the transmission units 101. This requires each transmission unit to have the functions of detecting, controlling and sending these synchronization messages.

On the DS1 metal transmission line 104, the synchronization messages are sent over a DS1 ESF data link that is a control link.

FIG. 2 shows a data format for data transmission over the DSI metal transmission line 104. In this data format, one frame (125 microseconds and 193 bits) is composed of a set of 24 item slots of 8-bit data, and one multiframe is composed of a set of 24 frames. One frame is transmitted bit by bit starting with the frame bit #0 and ending with the frame bit 192, and one multiframe is transmitted starting with the frame 1 and ending with the frame 24.

FIG. 3 shows a data format for DS1 frame bits. 13 bits among the frame bits #0 to #4439 within one multiframe composed of 24 frames, which are marked with X in the field DL (Data Link) shown in FIG. 3 make up a data link having a transmission rate of 4 kb/s (kilobits per second), whereby the DS1 ESF data link is formed. In FIG. 3, the FPS field indicates a framing pattern sequence for frame extraction and the CRC field indicates cyclic redundancy check channels for data error detection and correction.

In the SONET optical transmission line 103, the synchronization messages are transmitted using an S1 byte within a line overhead that is a unit of control information.

FIG. 4 shows a data format for the overhead in SONET. Its details are beyond the scope of the present invention and hence description thereof is omitted herein. The S1 byte is placed in the byte position indicated by * in the line overhead section shown in FIG. 4 and then transmitted.

FIG. 5 shows the contents of the quality levels presented by the synchronization messages. The quality levels are defined with ppm as units. For each of the quality levels, a quality level value (1 to 7) and set values on the DS1 ESF data link and the S1 byte in the synchronization message corresponding to the quality level are indicated.

Typical examples will be described hereinafter. "Stratum 1 Traceable" indicates the highest quality level, which corresponds to the quality level of the clock reference that the BITS 102 (see FIG. 1) provides. "Stratum 3 Traceable" and "±20 ppm Clock Traceable" correspond to the quality level of the internal clock of the transmission unit 101. "Stratum 4 Traceable" indicates a quality level that may occur on the DS1 metal transmission line 104. This quality level is one that rarely occurs on the SONET optical transmission line 103, and hence the S1 byte value therefor is not defined. "Don't Use for Synchronization" is a quality level for informing that no clock reference can be used for synchronous control. "Network Provider Specific Synchronization" is a quality level that is reserved for future use.

To process the synchronization messages, each transmission unit 101 of FIG. 1 has come to be required to have a function of synchronizing with the clock reference of the highest quality level, by comparing synchronization messages received together with a plurality of clock references received over transmission lines which are terminated by that transmission unit itself, a function of outputting a synchronization message corresponding to the quality level of the clock reference that is currently in use to the S1 byte that is an overhead byte on the SONET optical transmission line 103 terminated by that transmission unit, and a function of outputting the synchronization message corresponding to that quality level to the DS1 ESF data link on the DS1 metal transmission line 104 in the case where that transmission unit terminates the DS1 metal transmission line 104 as well. It is considered that such functions will be widely applied to all synchronous networks.

In the following descriptions, of clock references that are available to the transmission unit 101 for its operation or that can be output to other units as a timing supply, a clock reference that the transmission unit is actually using for its operation or outputting for timing supply is referred to as an active reference for the sake of convenience, as shown in FIGS. 6 or 7.

Conventionally, in selecting the active reference, the user uses a command to specify a group of transmission lines or BITS inputs which contain a clock reference that he or she wishes to use as the active reference, whereby the active reference is fixedly determined and selectable clock references are also fixedly determined.

As an example, when, in FIG. 8, the group that contains a clock reference that the user wishes to use as the active reference is set as group #1, the group #1 work line, the group #1 protection line, the holdover clock and the internal clock are set as the selectable clock references and the group #1 work line is set as the active reference. Here, the holdover clock refers to a clock that the transmission unit 101 outputs in synchronism with the past active reference stored by that unit when the current active reference fails. The internal clock refers to a clock which is output by the internal clock generator of the transmission unit 101 at its own timing. The work line refers to the SONET optical transmission line 103 that is normally employed. The protection line refers to a backup for the SONET optical transmission line 103.

In this example, in the event that a line failure occurs in the group #1 work line, the active reference is switched to the group #1 protection line. Moreover, in the event of a line failure in that line, the active reference is switched to the holdover clock. Furthermore, in case where a line failure occurs in that line, the active reference is switched to the internal clock. In these cases, none of the clock references associated with the group #2 can be selected.

Thus, in the conventional system, once a group is selected, clock references selectable as the active reference are decided fixedly. Also, the priority of the clock references selectable as the active reference is decided fixedly. That is, in the conventional system, clock references selectable as the active reference and the priority used in selecting among the clock references are decided fixedly by specifying a group. In the selected group, priority is established among the clock references such that the work line (primary line) clock reference, the protection line (secondary line) clock reference, the holdover clock and the internal clock are placed in the order of descending priorities.

In the conventional system, therefore, since selectable clock references and their priorities cannot be decided flexibly, the possibility exists that, even if there is a clock reference of a high quality, it may not be selected as the active reference. As a result, in the entire network, a clock reference of the highest quality is not always selected, so that the network may be synchronized with a clock of a low quality. This is a first problem with the conventional technique.

In general, some of clock references cause a state called a timing loop, where, in a specific area within the network, a loop is formed in which only clocks of the same quality are referenced and clocks of higher quality cannot be referenced. Such clock references are those that should not be selected. In the conventional system in which a group the user wishes to use for the active reference is selected, there is the possibility that a clock reference that may cause such a timing loop as described above is accidentally selected as the active reference, and consequently that clock reference produces a timing loop. This is a second problem with the conventional technique.

Moreover, in the conventional system, restrictions are made on clock references selectable as the active reference; sufficient redundancy does not exist in selectable clock references. Thus, there frequently occurs a phenomenon in which the active reference is set to either the holdover clock or the internal clock and the whole network is synchronized with a clock of low quality. This is a third problem with the conventional technique.

Furthermore, in the conventional system in which a group is specified for use as the active reference, even when the transmission unit 101 outputs a clock reference as a timing supply output to another unit, the primary clock in the timing supply output is derived from the work line in the specified group and the secondary clock is derived from the protection line in the specified group, as shown in FIG. 9.

For this reason, even if a clock reference of higher quality exists in another group, it is impossible to select it as the active reference and output it as the timing supply output to another unit. This is a fourth problem with the conventional technique.

In the conventional system, in the event that the active reference fails, an alarm indication signal (AIS) may be immediately sent as the timing supply output. That is, there is little redundancy in clock references as the timing supply output. This is a fifth problem with the conventional technique.

Furthermore, conventionally it is impossible to send clocks of the highest quality all the time for both the primary and secondary clocks in the timing supply output. This is a sixth problem with the conventional technique.

Furthermore, conventionally it is possible to use, in combination with the active reference selection described above, an active reference forced switching command that, once the active reference is switched to a clock reference, does not allow the active reference to be switched to another clock reference. With the use of this command, it becomes possible to switch the active reference to any clock reference by force. In the conventional system, therefore, in the event that the active reference is switched to a failing clock reference by force or a clock reference to which the active reference has been switched fails, subsequent clock selection may become impossible. In this case, the system would fail. This is a seventh problem with the conventional system.

In addition, in the conventional system, when the active reference is controlled so that a clock reference of high priority will be selected all the time on the basis of synchronization messages, there arises the possibility that the following phenomenon may occur. Assume, for example, that clock references selectable as the active reference include the group #1 work line, the group #1 protection line, the holdover clock, and the internal clock, they are selected by priority in the order in which they are listed, and the clock reference of the highest quality is the group #1 protection line. In this case, the group #1 protection line is selected as the active reference conventionally. Next, when the group #1 work line becomes equal in quality to the group #1 protection line, the active reference is switched to the group #1 work line conventionally. Thus, if a clock reference that is higher in priority than a clock reference which is currently selected as the active reference becomes equal in quality to the active reference, then the active reference will be switched to the clock reference of higher priority at all times. Thus, switching may occur frequently, increasing the burden of processing on the CPU in the transmission unit 101. This is an eighth problem with the conventional technique.

SUMMARY OF THE INVENTION

It is therefore an object of the present invention to implement a good-performance active reference switching technique which, in selecting the active reference and timing supply output, permits selectable clock references and their selecting priorities to be decided flexibly.

The invention is directed to a unit, which is installed in each of transmission units that make up a network to establish network synchronization, for selecting one clock reference from a plurality of clock references received by the corresponding transmission unit as the active reference for controlling the operation of the corresponding transmission unit itself or the active reference for timing supply to an external unit connected to the corresponding transmission unit, on the basis of the quality level of each of the clock references presented by a synchronization message received with the corresponding clock reference.

The invention has a first configuration as described below.

A list storage unit stores a source priority list into which the clock references having their own quality levels are selectable as the active reference, and their selection priorities, have been entered.

An active reference control unit is adapted to reference the source priority list for selecting the active reference from the clock references entered into the list. The active reference control unit performs operations of: selecting a clock reference that is of the highest quality level of the clock references entered into the source priority list as the active reference; when two or more clock references of the same quality level are entered into the source priority list, selecting a clock reference that is of the highest priority of the clock references of the same quality level as the active reference; and, when a clock reference having a quality level higher than that of a clock reference currently selected as the active reference is received and it has been entered into the source priority list, selecting it as the active reference.

The first configuration of the invention allows a clock reference of a high quality level to be selected as the active reference all the time, by entering clock references of a high quality level into the source priority list. Thus, the whole network can be synchronized with a clock of high quality level all the time.

Moreover, by deleting a clock reference that must not be selected as the active reference from the source priority list, the creation of a timing loop within the network can be avoided.

Furthermore, by entering a plurality of clock references into the source priority list, sufficient redundancy can be included among the selectable clock references, which circumvents a phenomenon in which the active reference is selected to be the holdover clock or the internal clock, and consequently the whole network is synchronized to a clock of low quality level.

The invention can further have a second configuration as described below.

That is, the list storage unit stores a plurality of source priority lists for a plurality of active references for timing supply to an external unit connected to the corresponding transmission unit, and the active reference control unit individually references each of the source priority lists stored in the list storage unit for the plurality of active references for timing supply, to thereby select each of the active references for timing supply.

The second configuration of the invention allows a clock reference of high quality level to be selected and then output as the timing supply output all the time.

Moreover, the second configuration of the invention allows the active reference for the timing supply to be set flexibly. This allows sufficient redundancy to exist in clock references for timing supply output, circumventing a situation in which an alarm indication signal (AIS) is immediately output as the timing supply output.

Furthermore, the second configuration of the invention allows a clock of the highest quality level to be output for both the primary and secondary references for the timing output at all times.

The invention can further have a third configuration as described below.

That is, as an alternative to the operation of selecting the active reference on the basis of the source priority list, the active reference control unit selects as the active reference a clock reference specified by a first switching command that does not allow the active reference, once switched to a clock reference, to be switched to another clock reference. In the event that the active reference is switched by force to a failing clock reference or a clock reference to which the active reference has been switched fails, the active reference control unit switches the active reference to either a holdover clock or an internal clock of the corresponding transmission unit.

The third configuration of the invention can circumvent, even at the time of execution of forced switching, a situation in which no clock reference can be derived and the service fails.

The invention can further have a fourth configuration as described below.

That is, as an alternative to the operation of selecting the active reference on the basis of the source priority list, the active reference control unit selects as the active reference a clock reference specified by a second switching command that allows the active reference, once switched to a clock reference, to be switched to another clock reference. In the event that a clock reference to which the active reference has been switched by the second switching command fails, the active reference control means then reselects as the active reference a clock reference which had been selected before switching, and, in the event that the quality level of the active reference after switching goes below the quality level of other clock references, reselects as the active reference a clock reference which, of the other clock references, is of the highest quality level.

The fourth configuration of the invention allows a clock reference of the highest quality level to be derived at all times, even at the time manual switching is specified, which circumvents a situation in which the whole network is synchronized to a clock reference of low quality level.

Additionally, the combined use of the source priority list based active reference selection method, the forced switching command based method and the manual switching command based method allows the intentional switching of the active reference to be implemented flexibly and special network employment conditions, such as maintenance, etc., to be met flexibly.

The invention can further have a fifth configuration as described below.

That is, the active reference control unit alternatively performs, as specified by a user, either in a first mode in which, when a predetermined clock reference with a predetermined high quality level is received, a reference is made to the source priority list to select the predetermined clock reference as the active reference for timing supply, or in a second mode, in which a clock reference specified in advance is selected as the active reference for timing supply.

The fifth configuration of the invention allows the timing supply output to be set more flexibly.

The invention can further have a sixth configuration as described below.

That is, the active reference control unit alternatively performs, as specified by a user, either in a third mode in which, when the quality level of a clock reference entered into the source priority list and having higher priority than a clock reference that is currently used as the active reference becomes equal to that of the active reference currently used, the clock reference of higher priority is selected as the active reference, or in a fourth mode, in which the active reference remains unchanged.

In the sixth configuration, the execution of the fourth mode allows a situation in which the frequent switching of the active reference increases the processing burden on the CPU of the transmission unit to be circumvented.

The invention can further have a seventh configuration as described below.

That is, the active reference control unit performs a control operation of, at the time of execution of an insert command by a user, inserting a specified clock reference in the position of predetermined priority in the source priority list stored in the list storage unit and automatically decreasing the priority of each of the other clock references of a lower priority than the predetermined priority by one position, and performs a control operation of, at the time of execution of a delete command by the user, deleting a specified clock reference of a predetermined priority from the source priority list and automatically increasing the priority of each of the other clock references of lower priority than the predetermined priority of the clock reference deleted by one position.

The seventh configuration allows the insertion and deletion of clock references to and from the source priority list to be made with few operations.

The invention can further have an eighth configuration as described below.

That is, the active reference control unit performs an operation of, if, at the termination of setup of the source priority list for the active reference used to operate the corresponding transmission unit, a holdover clock produced by the corresponding transmission unit has not been entered into the list, entering the holdover clock into the position of the lowest priority in the source priority list, and, if, at the termination of a setup of a source priority list for timing supply for an external unit connected to the corresponding transmission unit, an internal clock of the corresponding transmission unit has not been entered into the list, entering the internal clock into the position of the lowest priority in the source priority list.

By the eighth configuration, at worst a clock of the lowest quality level can be used as the active reference used to operate the transmission unit. This prevents the service failure.

The invention can further have a ninth configuration as described below.

That is, the active reference control unit selects an internal clock of the corresponding transmission unit as the active reference when any clock reference that is selectable as the active reference is exhausted from the source priority list.

The ninth configuration of the invention allows an internal clock of the lowest quality level to be selected as the active reference for operating the transmission unit, in the event that there is no external clock reference that can be selected, avoiding the service failure.

BRIEF DESCRIPTION OF THE DRAWINGS

Other objects and advantages of the present invention will be apparent to those skilled in the art from the following description of the preferred embodiments of the invention in conjunction with the accompanying drawings in which:

FIG. 3 shows a data format for DSI frame bits;

FIG. 4 shows a data format for the overhead in SONET;

FIG. 5 shows the contents of quality levels;

FIG. 10 is the first diagram of a source priority list in accordance with a preferred embodiment of the present invention;

FIG. 12 is the second diagram of a source priority list in accordance with a preferred embodiment of the present invention;

FIG. 13 is the third diagram of a source priority list in accordance with a preferred embodiment of the present invention;

FIG. 15 is a diagram of the fourth source priority list in accordance with a preferred embodiment of the present invention;

FIG. 16 is a diagram of the fifth source priority list in accordance with a preferred embodiment of the present invention;

FIG. 18 is a diagram of the sixth source priority list in accordance with a preferred embodiment of the present invention;

DESCRIPTION OF THE PREFERRED EMBODIMENTS

Hereinafter, the preferred embodiments of the present invention will be described in detail with reference to the accompanying drawings.

The basic system configuration and the structure of synchronization messages used in the embodiments of the present invention remain unchanged from those shown in FIGS. 1 through 5 and FIG. 8, and described in connection with the Description of the Related Art. In the following descriptions, these drawings will be referred to as needed.

In the embodiments of the present invention, the transmission unit 101 (see FIG. 1) is equipped with a source priority list which allows clock references selectable as the active reference to be entered/deleted optionally, and their selecting priorities, indicating which clock reference to select, to be set optionally even in the case where a plurality of clock references of the same quality level are listed.

The source priority list can be defined separately for each of an operating clock of the transmission unit itself and primary and secondary clocks in the timing supply output for another unit connected to that transmission unit.

The transmission unit 101 switches the active reference based on the contents of the source priority list. That is, at first, only clock references that have been entered into the source priority list are used as clock references selectable as the active reference. Of the clock references entered, the clock reference of the highest quality level is selected as the active reference. If there are a plurality of clock references of the same quality level, then a clock reference that is assigned higher priority in the source priority list is selected. If a clock reference which is higher in quality level than the clock reference currently selected as the active reference appears, and it has been entered into the source priority list, it will be selected as the active reference.

Figure 11:
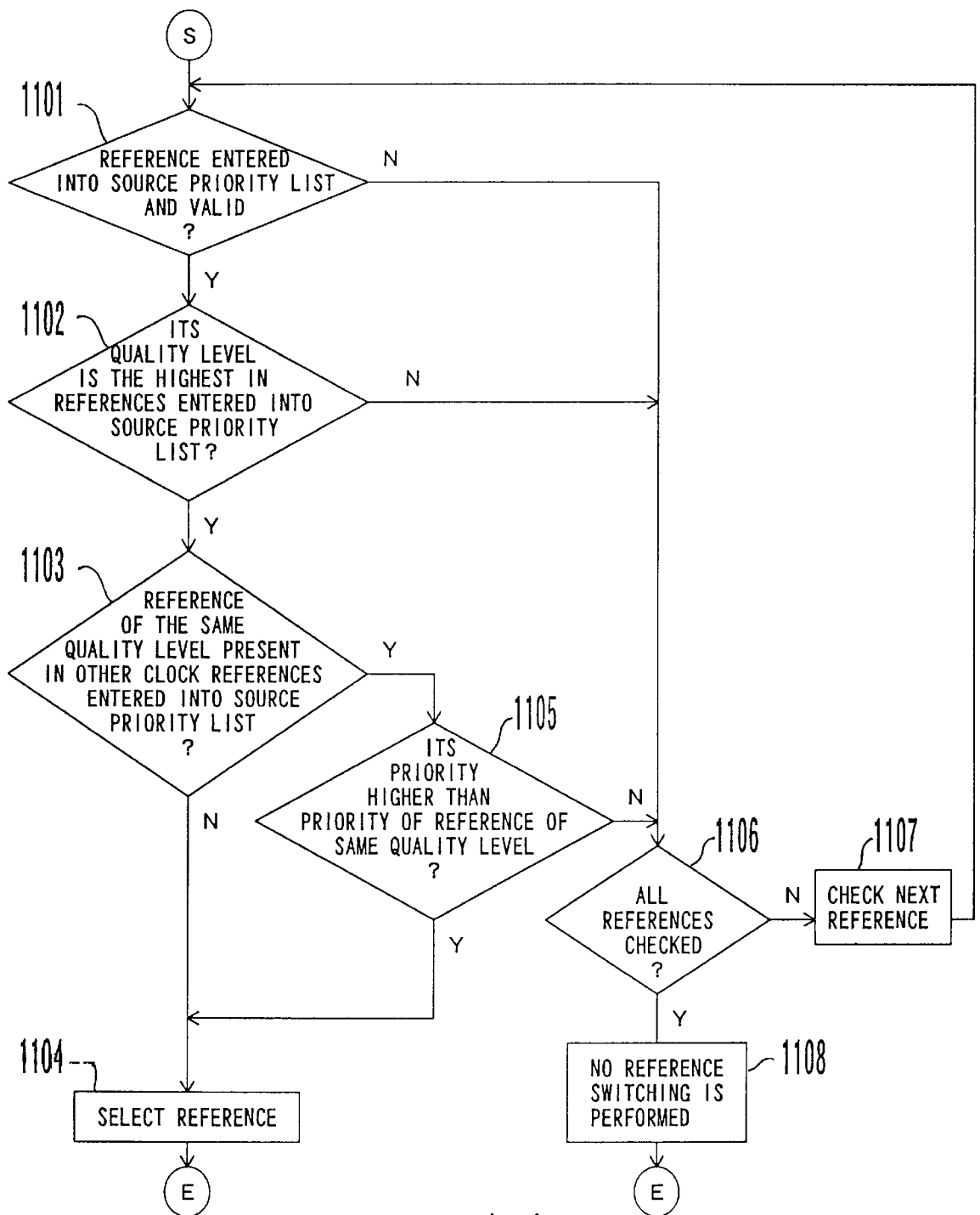
FIG. 11 is a flowchart of the source priority list referencing operation.

FIG. 11 is a flowchart for a control operation carried out by the transmission unit 101 to switch the active reference based on the contents of the source priority list.

When there arises a reason for switching the active reference from one clock reference to another because of variations in quality level, a clock reference is first selected from among the clock references that are being received by the transmission unit 101 as an object clock reference, and a determination is then made as to whether or not it has been entered into the source priority list and, at the same time, whether or not it is valid (step 1101 in FIG. 11).

If the object clock reference has not been entered in the source priority list or it is not valid, (No in step 1101), then the next object clock reference is extracted and the same check as above is performed on it (steps 1106, 1107 and 1101). This operation is repeated until it is decided in step 1106 that all of the clock references have been checked.

If the determination in step 1101 is that the object clock reference has been entered into the source priority list and it is valid, (Yes in step 1101), then a determination is made in step 1102 as to whether or not the quality level of that object clock reference, determined by a synchronization message, is the highest in the clock references entered into the source priority list.

If the quality level of that object clock reference is not the highest in the clock references entered into the source priority list, (No in step 1102), then the next object clock reference is extracted and then the same control operations as in steps 1106, 1107 and 1101 are performed on it. This control is repeated until it is decided in step 1106 that the check has been performed on all the clock references.

If, on the other hand, the quality level of the object clock reference is the highest in the clock references entered into the source priority list, (Yes in step 1102), then a determination is made as to whether or not a clock reference of the same quality level as that object clock reference is present in the other clock references entered into the source priority list (step 1103).

If the determination is that a clock reference of the same quality level as that object clock reference is not present in the other clock references entered into the source priority list, (No in step 1103), then that object clock reference is selected as the active reference (step 1104). Then, the switching of the active reference is terminated.

If a clock reference having the same quality level as the object clock reference is present in the other clock references entered into the source priority list, (Yes in step 1103), then a determination is made as to whether or not the priority of the object clock reference on the source priority list is higher than that of a clock reference having the same quality level as the object clock reference (step 1105 in FIG. 11).

If the priority of the object clock reference on the source priority list is higher than that of a clock reference having the same quality level as the object clock reference, (Yes in step 1105), then that object is selected as the active reference (step 1104). Then, the switching of the active reference is terminated.

If, on the other hand, the priority of the object clock reference on the source priority list is not higher than that of a clock reference having the same quality level as the object clock reference, (No in step 1105), then the next object clock is extracted and the procedure returns to step 1101 through steps 1106 and 1107. These control operations are repeated until it is decided in step 1106 that all the clock references have been checked.

When it is decided in step 1106 that all the clock references have been checked in the above sequence of control operations, no active reference switching is performed (step 1108).

Note that the contents of the source priority list can be set up with the use of a command.

Figure 1:
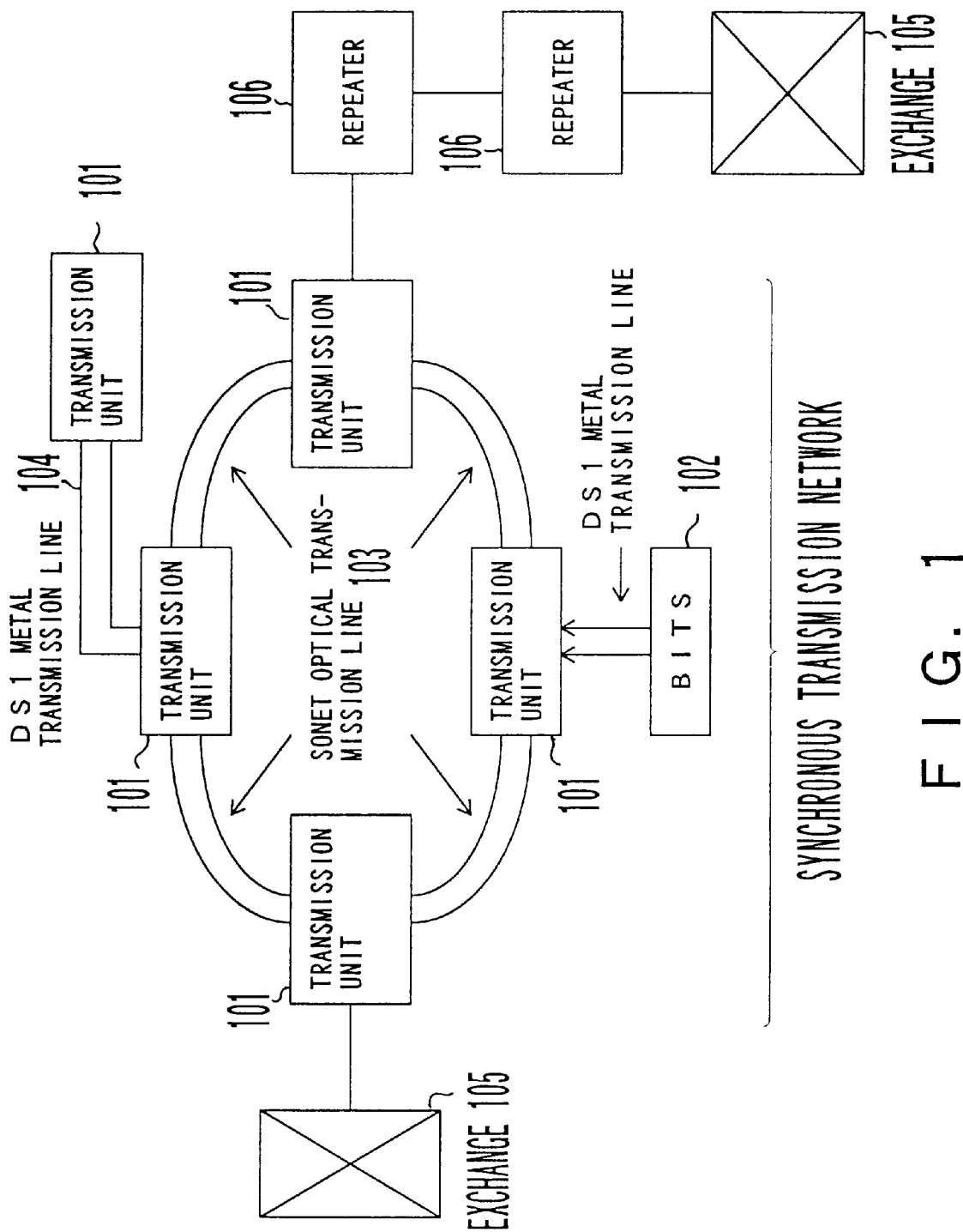
FIG. 1 shows an arrangement of a synchronous network.
Figure 2:
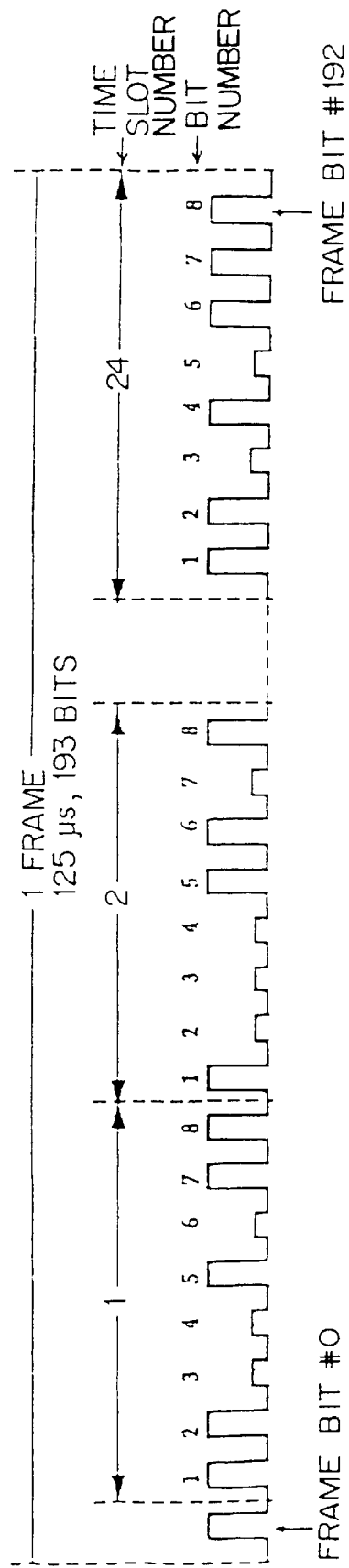
FIG. 2 shows a DSI data format.
Figure 6:
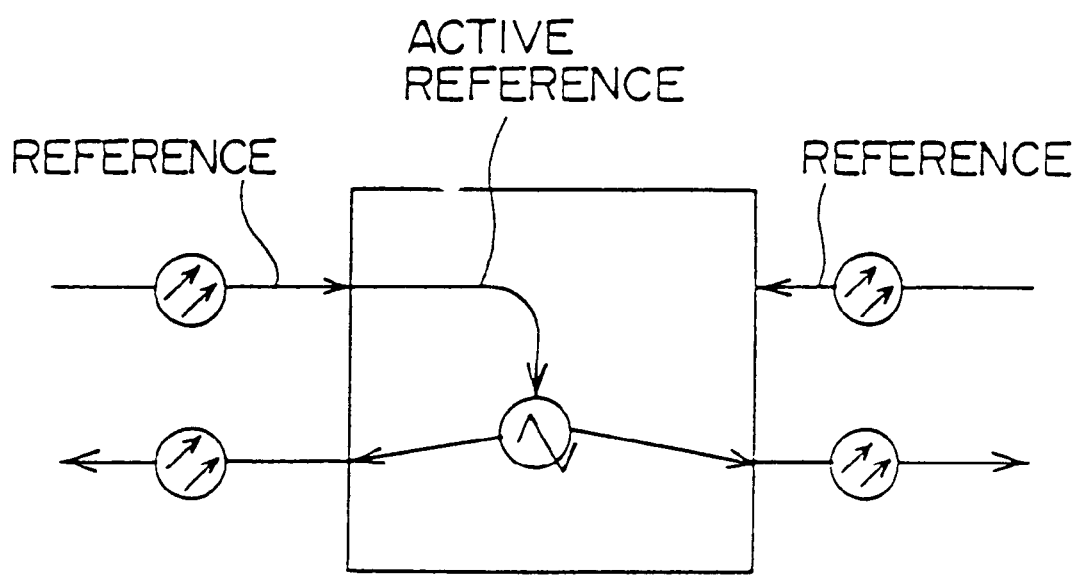
FIG. 6 is a schematic diagram (1) for use in explanation the active reference.
Figure 7:
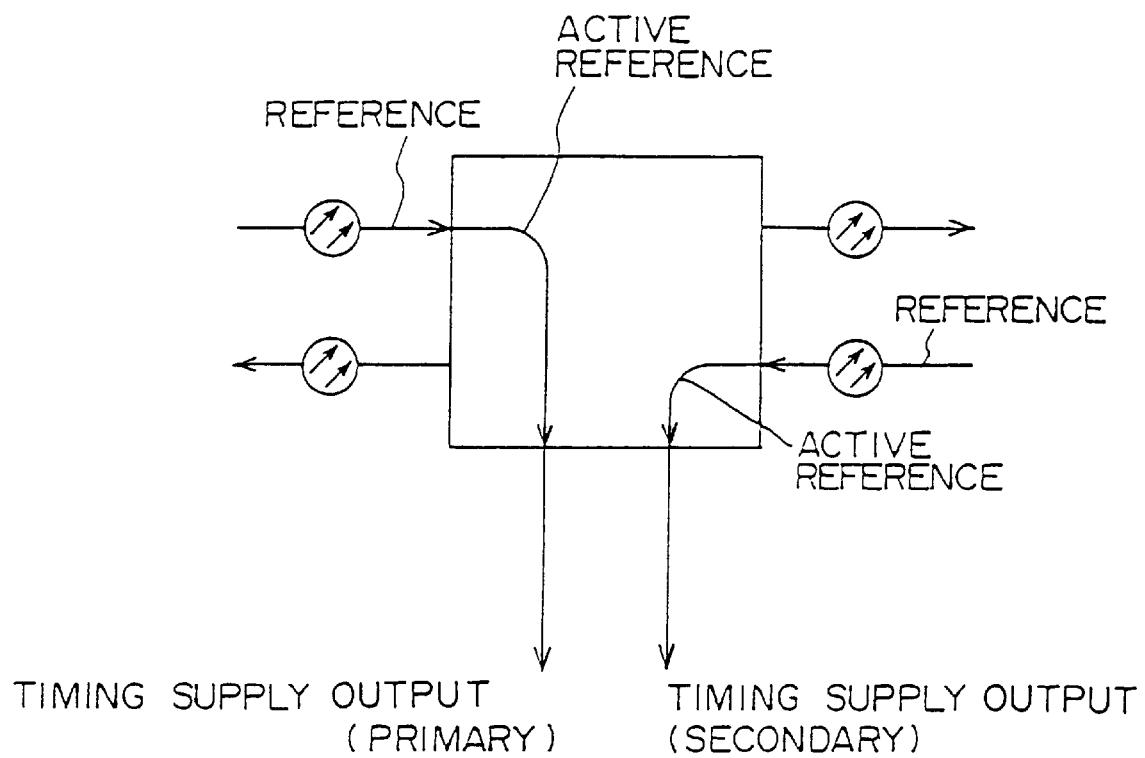
FIG. 7 is a schematic diagram (2) for use in explanations the active reference.
Figure 8:
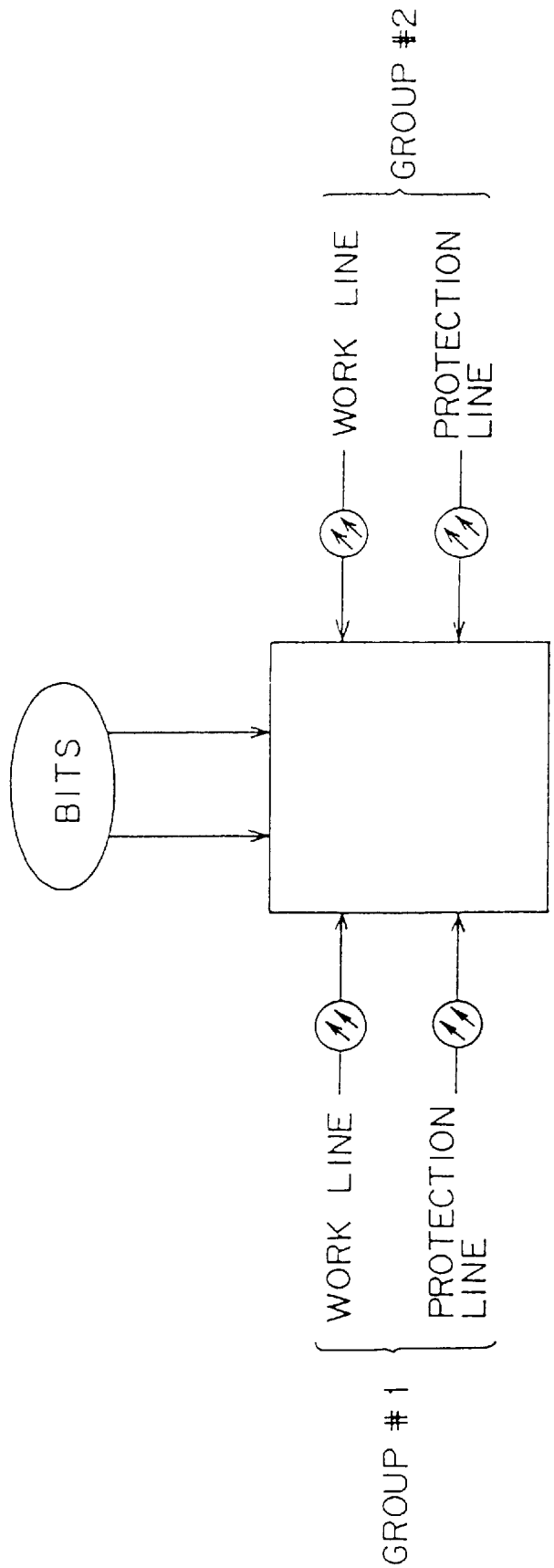
FIG. 8 is a schematic diagram of for use in explanation of clock references.
Figure 9:
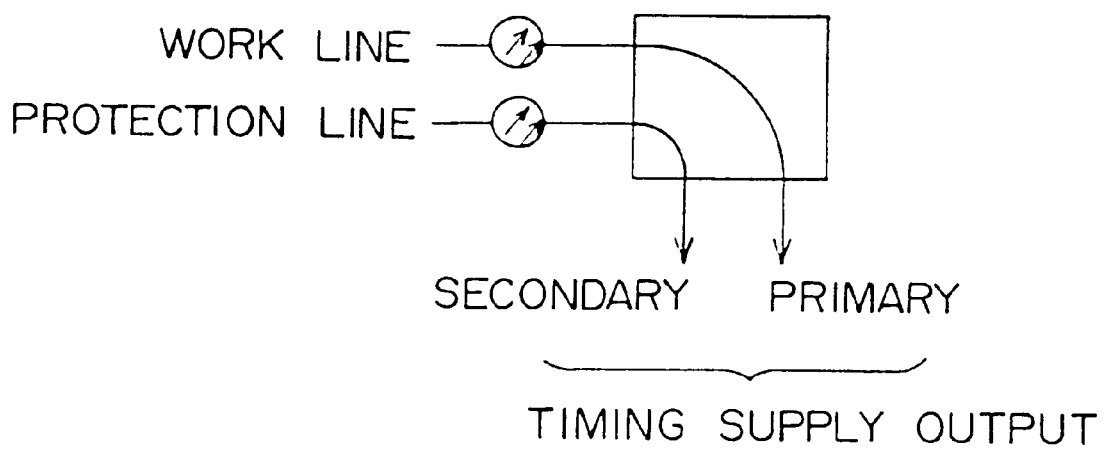
FIG. 9 is a schematic diagram for use in explanation of a prior art technique.

FIG. 10 shows an example of a source priority list in the transmission unit 101 shown in FIG. 1. In FIG. 10, clock references selectable as the active reference include the BITS input primary reference, the BITS input secondary reference, the group #1 work line, the group #1 protection line, the group #2 work line, the group #2 protection line, and the holdover clock, and their selecting priorities are in the order in which they are listed.

If, in selecting the active reference, the clock reference which, of all the clock references entered into the source priority list shown in FIG. 10, is the highest in quality level is the group #1 work line, it will be selected as the active reference. If three clock references, i.e., the BITS input primary reference, the BITS input secondary reference, and the group #2 work line, have the highest quality level, then the BITS input primary reference will be selected as the active reference in accordance with the priority of the clock references in the source priority list. In the event that the clock reference currently used as the active reference fails, a clock reference which, of the remaining clock references entered into the list, has the highest quality level will be selected.

Thus, by entering clock references of high quality level into the source priority list, the active reference of high quality level can be selected at any time, and accordingly the whole network can be synchronized with a clock of high quality level at any time. This solves the first problem with the conventional technique.

Moreover, the creation of a timing loop within the network can be circumvented by deleting clock references that must not be selected as the active reference from the source priority list. This solves the second problem with the conventional technique.

Furthermore, sufficient redundancy can be included in selectable clock references by entering a plurality of clock references into the source priority list. This will circumvent the phenomenon in which the active reference is selected to be the holdover clock or the internal clock, and consequently the whole network becomes synchronized with a clock of low quality level. This solves the third problem with the conventional technique.

Next, with an embodiment of the present invention, by creating a separate priority list for each of the primary reference clock and the secondary reference clock in the timing supply output, it is possible to decide from which clock reference each reference output is to be derived.

Figure 14:
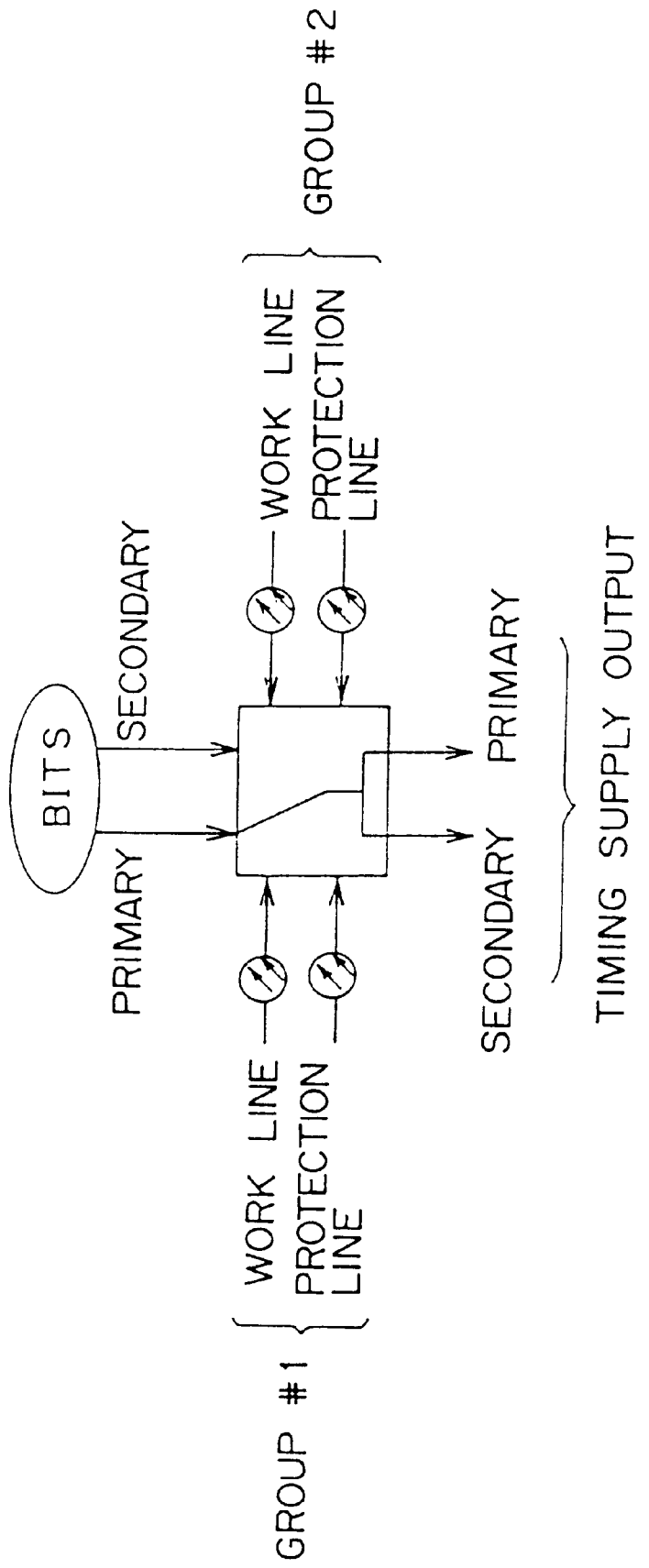
FIG. 14 is a schematic diagram for use in explanation of the operation of a preferred embodiment of the present invention.
Figure 17:
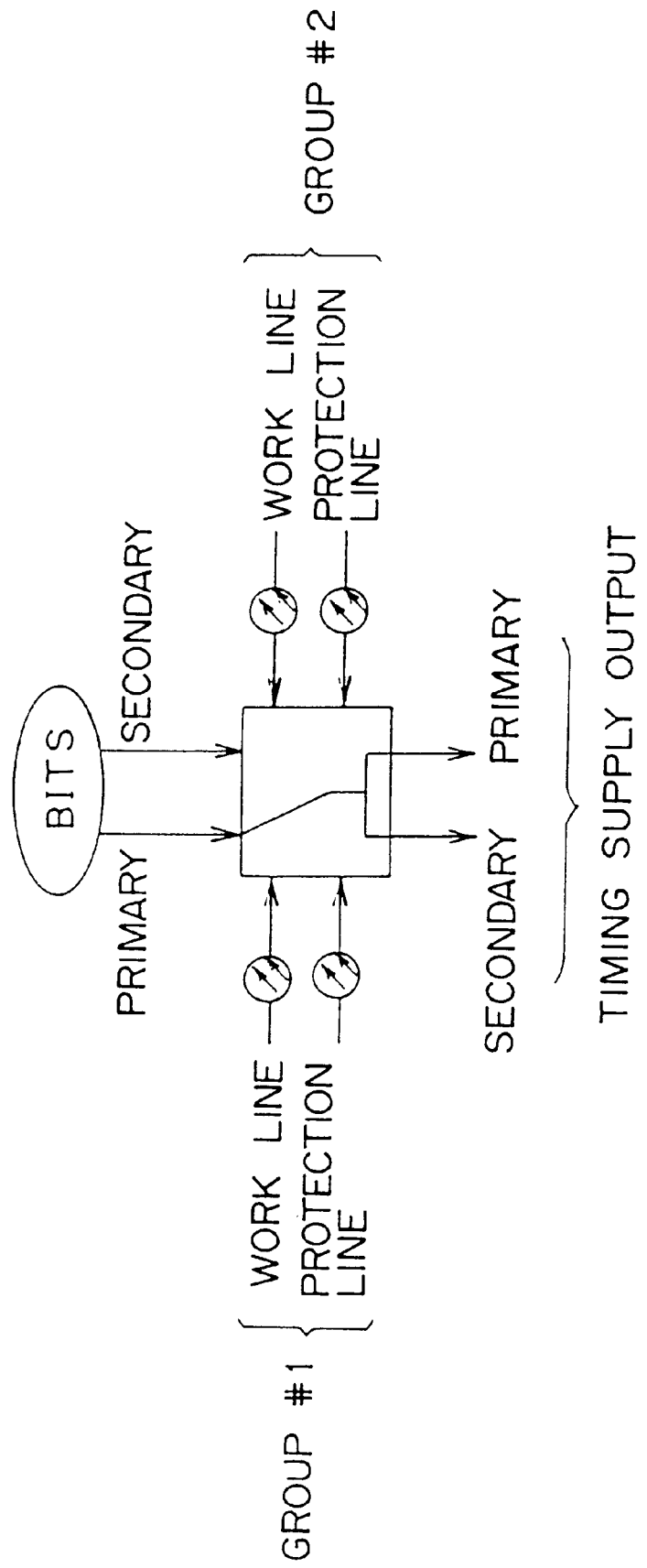
FIG. 17 is a schematic diagram for use in explanation of the operation of a preferred embodiment of the present invention.

For example, by creating source priority lists for the primary and secondary references in the timing supply output as shown in FIGS. 12 and 13, respectively, it becomes possible to set such timing supply output as shown in FIG. 14. Also, by creating source priority lists for the primary and secondary references in the timing supply output as shown in FIGS. 15 and 16, respectively, it becomes possible to set such timing supply output as shown in FIG. 17. In these figures, "Derived DS1 primary reference" and "Derived DS1 secondary reference" indicate that the timing supply output is one to the DSI metal transmission line 104 (see FIG. 1) to which other transmission units 101 are connected.

Such a configuration permits a clock reference of high quality level to be selected as the active reference and to be output as the timing supply output at any time. This solves the fourth problem with the conventional technique.

In addition, the above-described configuration permits the timing supply output to be set flexibly. For this reason, sufficient redundancy can be included in clock references for the timing supply output and the situation in which an AIS (Alarm Indication Signal) is sent immediately as the timing supply output can be circumvented. This solves the fifth problem with the conventional technique.

Moreover, the above-described configuration permits the same clock of the highest quality level to be delivered at any time for both the primary and secondary references of the timing supply output as shown in FIG. 17. This solves the sixth problem with the conventional technique.

Next, an embodiment of the present invention can be configured, combined with the above-described active reference selecting method based on the source priority list, to make a forced switching command available, which does not allow the active reference, once switched to a clock reference, to be switched to another clock reference.

In this configuration, in the event that the active reference is switched forcibly to a failing clock reference, or a clock reference to which the active reference has been switched fails, the active reference is switched forcibly to the holdover clock or the internal clock of the transmission unit 101 by specifying the forced switching command.

Thereby, even when the forced switching command is specified, the situation can be circumvented in which a clock reference cannot be derived and the service fails. This solves the seventh problem with the conventional technique.

Further, an embodiment of the present invention can be configured, combined with the active reference selecting method using the source priority list and the method using the forced switching command to switch the active reference, to make a manual switching command available.

In this configuration, when the manual switching command is specified, control is carried out such that the active reference is switched only to a clock reference that is placed in a state other than the failed state. Moreover, after the manual switching command has been specified, if a clock reference to which the active reference has been switched should fail, then control is performed such that the active reference is switched back to a clock reference which had been selected before switching. Furthermore, after the manual switching command has been specified, if a clock reference to which the active reference has been switched should go lower in quality level than another clock reference, then control is performed such that the active reference is switched back to a clock reference which is of the highest quality level among the remaining clock references.

Such a configuration allows a clock reference of the highest quality level to be derived at any time, even when the manual switching command is specified. It therefore becomes possible to circumvent the situation in which the whole network becomes synchronized with a clock reference of low quality level. Additionally, the combined use of the source priority list based active reference selection method, the forced switching command based method and the manual switching command based method, allows the intentional switching of the active reference to be implemented flexibly and special network employment conditions, such as maintenance, etc., to be met flexibly.

Next, an embodiment of the present invention can be configured in such a way as, when a BITS input is selected as the active reference, to allow the user to optionally switch between a mode in which the BITS input is selected as the primary reference and the secondary reference in the timing supply output based on the source priority list, and a mode in which the primary reference and the secondary reference are fixed to a clock reference specified by a command instead of the BITS input being selected.

Such a configuration allows the timing supply output to be set more flexibly.

Next, as described above, if a clock reference appears which has a quality level higher than that of the clock reference currently selected as the active reference, and that has been entered into the source priority list, it is selected as the active reference. In addition to such control, the embodiment of the present invention can set up a mode in which, even when the quality level of a clock reference of higher priority than the clock reference currently selected as the active reference becomes equal to that of the active reference, the active reference remains unchanged. Because of such a mode, it becomes possible to circumvent a situation in which frequent switching of the active reference results in an increase in the processing burden on the CPU of the transmission unit 101. Thus, the eighth problem with the conventional technique can be solved.

Next, in an embodiment of the present invention, when it is desired to change the source priority list as shown in FIG. 18 by adding the BITS input primary clock reference to the top-priority position of the list shown in FIG. 12, an insert command can be set up which performs a control operation of automatically inserting a clock reference in the source priority list, and automatically decreasing the priority of any other clock reference by one position in the list. In addition, a delete command can be set up which performs a control operation of deleting only a certain clock reference from the source priority list, and automatically increasing the priority of the other clock references of lower priority than that clock reference by one position in the list.

Such a group of commands allows the insertion and deletion of clock references to and from the source priority list to be made with few operations.

As described above, in the embodiment of the present invention, only the clock references entered into the source priority list are used as clock references selectable as the active reference. Thus, failure to enter the holdover clock or the internal clock into the source priority list may result in the service failure. That is, when the quality level of the active reference goes down and any clock reference selectable as the active reference is exhausted from the source priority list, it becomes impossible to derive any clock. Thus, the whole network or some of the transmission units 101 fail.

The embodiment of the present invention can therefore be configured such that, at the termination of the setup of the source priority list for the active reference used to operate the transmission units 101, if the holdover clock has not been entered into the list, it is automatically entered into the lowest-priority position in the list.

Further, at the termination of setup of the source priority list for the timing supply output, if the internal clock has not been entered into the list, it can automatically be entered into the lowest-priority position in the list.

Using such configurations, at worst the holdover clock can be used as the active reference used to operate the transmission units 101, and at worst the internal clock can be used as the timing supply output. It thus becomes possible to avoid the service failure.

Further, in the above configuration, failure to enter the internal clock into the source priority list may result in the service failure. That is, when the quality level of the active reference goes so low that the holdover clock cannot be selected and hence no external clock reference can be selected, any clock reference selectable as the active reference is exhausted from the source priority list. It thus become impossible to derive any clock.

The embodiment of the present invention can therefore be configured such that, when any clock reference selectable as the active reference is exhausted from the source priority list, the internal clock is automatically selected. Thereby, it becomes possible to avoid the worst situation that the service fails, even in the event that there is no external clock reference that can be selected.

Figure 19:
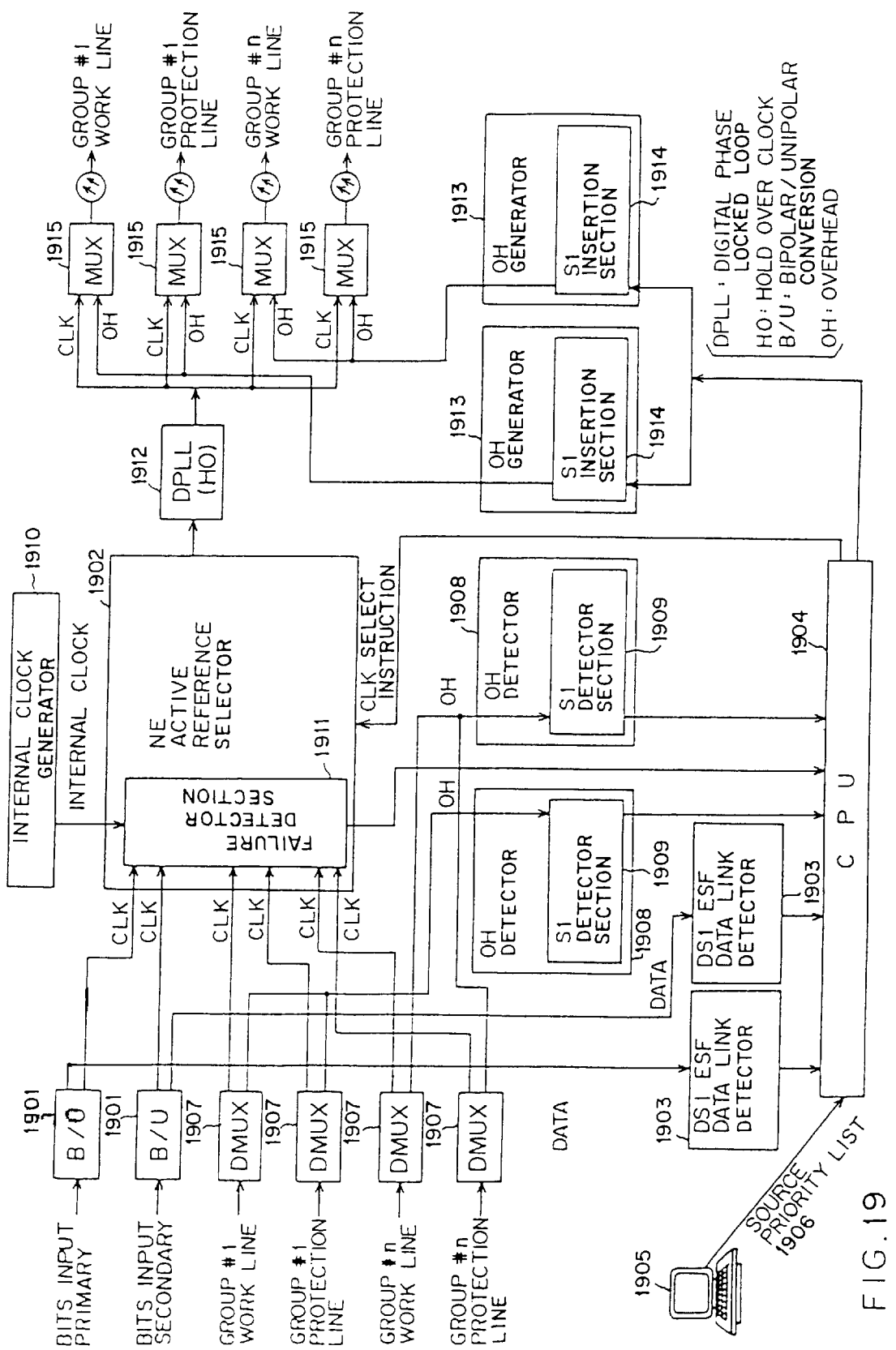
FIG. 19 shows a first hardware implementation of a preferred embodiment of the present invention.

FIG. 19 shows a hardware configuration of the transmission unit 101 (FIG. 1) for implementing the above-described embodiments adapted to select the active reference on which the unit itself operates.

A BITS input primary reference and a BITS input secondary reference are supplied from an external BITS 102 (FIG. 1) through two DSI metal lines 104 to two B/U units (bipolar/unipolar conversion units) 1901 where each of them is separated into a clock reference CLK and a data link DATA.

The clock reference CLK is entered into an NE active reference selector 1902 which selects a clock reference to which the transmission unit 101 is to be synchronized.

On the other hand, the data link DATA is applied to a DS1 ESF data link detector 1903 where the DS1 ESF data link (corresponding to DL in FIG. 3) is detected and the quality level indicated by a synchronization message contained in it is input to a CPU 1904.

A SONET signal received over each of group #1 work line, group #1 protection line, . . . , group #n work line and group #n protection line, is separated in a DMUX unit (demultiplexer) 1907 into a clock reference CLK and an overhead OH (refer to FIG. 4).

The clock reference CLK is entered into the NE active reference selector 1902. The overhead OH is entered into an OH Detector 1908, so that its S1 detector section 1909 detects an S1 byte (refer to FIGS. 4 and 5). The quality level indicated by a synchronization message contained in the S1 byte is inputted to the CPU 1904.

A failure detector section 1911 in the NE active reference selector 1902 monitors each of the clock references CLK from the B/U units 1901 and the DMUXs 1907 (2×n in number) for clock failure (input interruption) and, upon detecting a failure, informs the CPU 1904 of the occurrence of a failure.

When detecting an undefined bit string in a detected S1 byte (refer to FIG. 5), the S1 detector 1909 in each of a number n of OH detectors 1908, recognizes this as a failure and notifies the CPU of the occurrence of a failure.

A maintenance terminal 1905 presents a source priority list 1906 to the CPU 1904, which in turn stores the list in its internal storage.

In accordance with the flowchart described in FIG. 11, the CPU 1904 determines the NE active reference from the quality levels or failure notification presented by the two DS1 ESF data link detectors 1903, the two S1 detectors 1909, and the source priority list 1906. Using a CLK select instruction, the CPU 1904 presents the NE active reference thus determined to the NE active reference selector 1902. If the CPU 1904 fails to determine the clock reference CLK, it inputs to the NE active reference selector 1902 a CLK select instruction for allowing the internal clock generated by an internal clock generator 1910 to be selected.

At the same time, the CPU 1904 indicates to an S1 insertion section 1914 in an overhead generator (OH generator) 1913, a synchronization message to be written into the S1 byte in the overhead OH in a SONET signal to be output. In this synchronization message the quality level of the active reference is specified.

The NE active reference selector 1902 responds to the CLK selection instruction from the CPU 1904 to select a clock reference to be used as the NE active reference from clock references CLK input from the two B/U units 1901 and the 2×n DMUX units 1907, and sends the selected clock reference CLK to a digital phase locked loop (DPLL) 1912 (called a holdover HO).

The DPLL 1912 stores the NE active reference CLK inputted by the NE active reference selector 1902 while maintaining exact synchronization, and transfers it to a number 2×n of multiplexers (MUXs) 1915.

On the other hand, the S1 insertion section 1914 in each of the n OH generators 1913 writes the synchronization message inputted by the CPU 1904 into the S1 byte in the overhead OH. The first OH generator 1913 sends the overhead OH to the two MUXs 1915 for the group #1, and the second OH generator 1913 sends the overhead OH to the two MUXs 1915 for the group #2.

Each of the MUXs 1915 combines the NE active reference CLK sent from the DPLL 1912 and the overhead OH sent from the corresponding OH generator 1913 into a SONET signal, which in turn is sent over the corresponding SONET optical transmission line 103.

Figure 20:
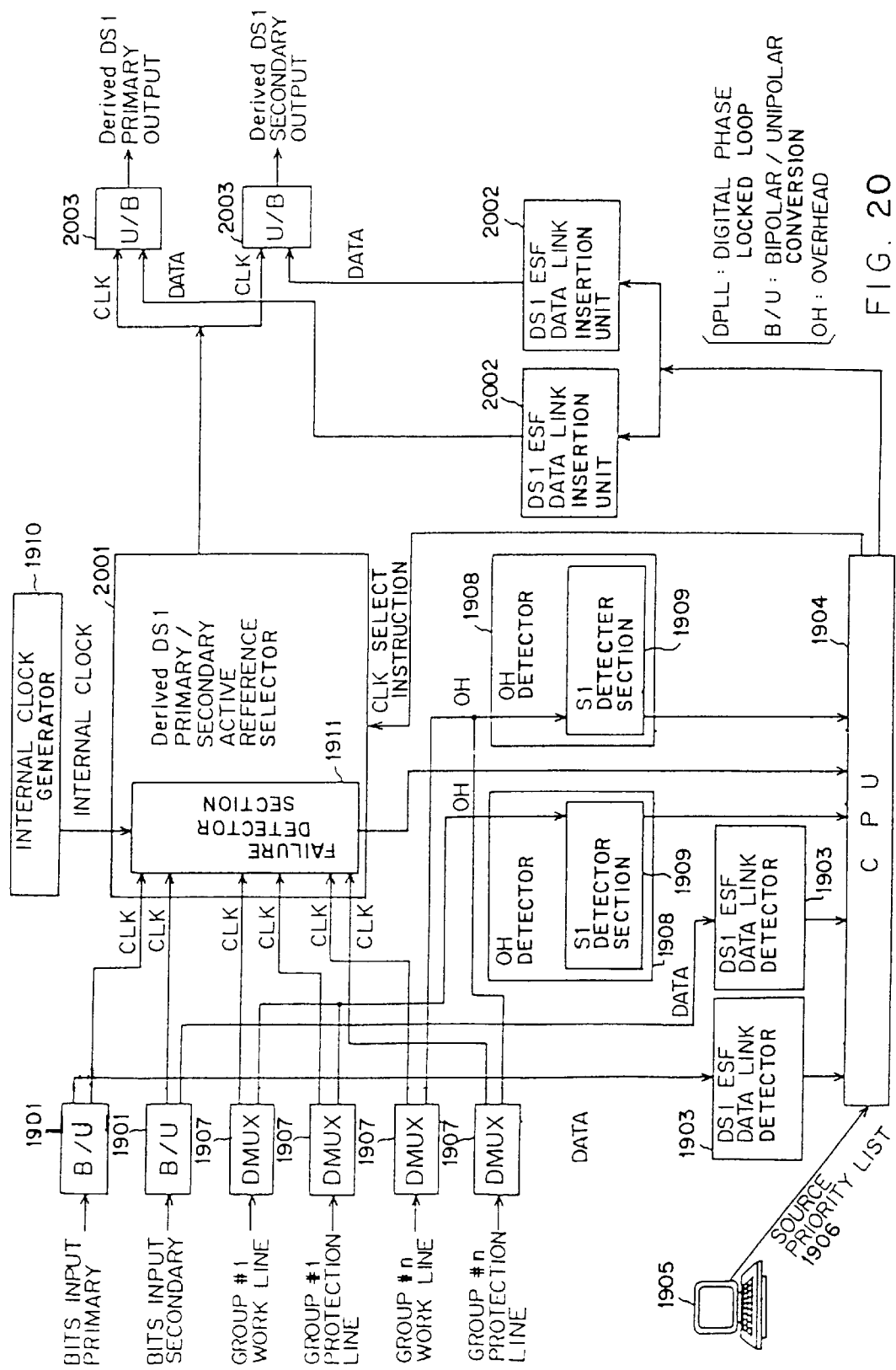
FIG. 20 shows a second hardware implementation of a preferred embodiment of the present invention.

Next, FIG. 20 shows a hardware implementation of the above-described embodiments for selecting Derived DS1 primary/secondary references for the timing supply output in the transmission unit 101 (FIG. 1).

In FIG. 20, like reference numerals are used to denote corresponding components to those in FIG. 19. That is, the configuration of FIG. 20 functions identically to that of FIG. 19, prior to the selection of the Derived DS1 primary/secondary active references. In this case, a Derived DS1 primary/secondary active reference selector 2001 has substantially the same function as the NE active reference selector 1902 of FIG. 19.

The configuration of FIG. 20 differs from that of FIG. 19 in the following respects.

First, the CPU 1904 indicates to each of two DS1 ESF data link insertion units 2002 a synchronization message to be written into a data link output signal.

Each of the two DS1 ESF data link insertion units 2002 writes the synchronization message input by the CPU 1904 into a DS1 ESF data link (data link DATA) and then sends the data link DATA to a corresponding one of two U/B units (unipolar to bipolar conversion units) 2003.

Next, the Derived DS1 primary/secondary active reference selector 2001 responds to a CLK selection instruction from the CPU 1904 to select a clock reference CLK to be used as the Derived DS1 primary/secondary active reference from clock references CLK sent from the two B/U units 1901 and the 2×n DMUXs 1907, and then sends it directly to the two U/B units 2003. In this case, the Derived DS1 primary/secondary active reference may be a single reference common to the two U/B units, or two separate references, one for each unit.

Each of the U/B units 2003 combines the Derived DS1 primary/secondary active reference CLK sent from the DS1 primary/secondary active reference selector 2001 and the data link DATA sent from the corresponding DS1 ESF data link insertion unit 2002 into a DS1 signal, and then sends it over the corresponding DS1 metal transmission line 104.

The two U/B units 2003 provide the Derived DS1 primary output and the Derived DS1 secondary output, respectively.

What is claimed is:

1. An active reference selecting unit, which is installed in each of transmission units that make up a network to establish network synchronization, for selecting one clock reference from a plurality of clock references received by the corresponding transmission unit as an active reference for controlling the operation of the corresponding transmission unit itself or an active reference for timing supply to an external unit connected to the corresponding transmission unit on the basis of the quality level of each of said clock references presented by a synchronization message received with the corresponding clock reference, comprising:

list storage means for storing a source priority list into which clock references, which are selectable as said active reference among the presented clock references and have said quality levels, and their selection priorities to select each of said clock references have been entered; and active reference control means adapted to reference said source priority list for selecting said active reference from said clock references entered into said list and thus selecting the clock reference having the highest quality level in said source list as said active reference.

2. The unit as claimed in claim 1, wherein said active reference control means alternatively performs, as specified by a user, either a first mode in which, when a predetermined clock reference with a predetermined high quality level is received, a reference is made to said source priority list to select said predetermined clock reference as said active reference for timing supply or a second mode in which a clock reference specified in advance is selected as said active reference for timing supply.

3. The unit as claimed in claim 1, wherein said active reference control means selects an internal clock that the corresponding transmission unit has as said active reference when any clock reference that is selectable as said active reference is exhausted from said source priority list.

4. An active reference selecting unit, which is installed in each of transmission units that make up a network to establish network synchronization, for selecting one clock reference from a plurality of clock references received by the corresponding transmission unit as an active reference for controlling the operation of the corresponding transmission unit itself or an active reference for timing supply to an external unit connected to the corresponding transmission unit on the basis of the quality level of each of said clock references presented by a synchronization message received with the corresponding clock reference, comprising:

list storage means for storing a source priority list into which said clock references, which are selectable as said active reference and have said quality levels, and their selection priorities have been entered; and active reference control means adapted to reference said source priority list for selecting said active reference from said clock references entered into said list, wherein said active reference control means performs operations of:

selecting a clock reference that is of the highest quality level of said clock references entered into said source priority list as said active reference;

when two or more clock references of the same quality level are entered into said source priority list, selecting a clock reference that is of the highest priority of said clock references of the same quality level as said active reference; and when a clock reference having a quality level higher than that of a clock reference currently selected as said active reference is received and it has been entered into said source priority list, selecting it as said active reference.

5. An active reference selecting unit, which is installed in each of transmission units that make up a network to establish network synchronization, for selecting one clock reference from a plurality of clock references received by the corresponding transmission unit as an active reference for controlling the operation of the corresponding transmission unit itself or an active reference for timing supply to an external unit connected to the corresponding transmission unit on the basis of the quality level of each of said clock references presented by a synchronization message received with the corresponding clock reference, comprising:

list storage means for storing a source priority list into which said clock references, which are selectable as said active reference and have said quality levels, and their selection priorities have been entered; and active reference control means adapted to reference said source priority list for selecting said active reference from said clock references entered into said list, wherein said list storage means stores a plurality of source priority lists for a plurality of active references for timing supply to an external unit connected to the corresponding transmission unit, and said active reference control means individually references each of said source priority lists stored in said list storage means for said plurality of active references for timing supply to thereby select each of said active references for timing supply.

6. An active reference selecting unit, which is installed in each of transmission units that make up a network to establish network synchronization, for selecting one clock reference from a plurality of clock references received by the corresponding transmission unit as an active reference for controlling the operation of the corresponding transmission unit itself or an active reference for timing supply to an external unit connected to the corresponding transmission unit on the basis of the quality level of each of said clock references presented by a synchronization message received with the corresponding clock reference, comprising:

list storage means for storing a source priority list into which said clock references, which are selectable as said active reference and have said quality levels, and their selection priorities have been entered; and active reference control means adapted to reference said source priority list for selecting said active reference from said clock references entered into said list, wherein, as an alternative to the operation of selecting said active reference on the basis of said source priority list, said active reference control means selects as said active reference a clock reference specified by a first switched command that does not allow said active reference, once switched to a clock reference, to be switched to another clock reference and then, in the event that said active reference is switched by force to a failing clock reference or a clock reference to which said active reference has been switched fails, switches said active reference to either a holdover clock or an internal clock that the corresponding transmission unit has.

7. An active reference selecting unit, which is installed in each of transmission units that make up a network to establish network synchronization, for selecting one clock reference from a plurality of clock references received by the corresponding transmission unit as an active reference for controlling the operation of the corresponding transmission unit itself or an active reference for timing supply to an external unit connected to the corresponding transmission unit on the basis of the quality level of each of said clock references presented by a synchronization message received with the corresponding clock reference, comprising:

list storage means for storing a source priority list into which said clock references, which are selectable as said active reference and have said quality levels, and their selection priorities have been entered; and active reference control means adapted to reference said source priority list for selecting said active reference from said clock references entered into said list, wherein, as an alternative to the operation of selecting said active reference on the basis of said source priority list, said active reference control means selects as said active reference a clock reference specified by a switching command that allows said active reference, once switched to a clock reference, to be switched to another clock reference and then, in the event that a clock reference to which said active reference has been switched by said switching command that allows said active reference to be switched to another clock reference fails, reselects as said active reference a clock reference which had been selected before switching, and, in the event that the quality level of said active reference after switching goes below the quality level of other clock references reselects as said active reference a clock reference which, of said other clock references, is of the highest quality level.

8. An active reference selecting unit, which is installed in each of transmission units that make up a network to establish network synchronization, for selecting one clock reference from a plurality of clock references received by the corresponding transmission unit as an active reference for controlling the operation of the corresponding transmission unit itself or an active reference for timing supply to an external unit connected to the corresponding transmission unit on the basis of the quality level of each of said clock references presented by a synchronization message received with the corresponding clock reference, comprising:

list storage means for storing a source priority list into which said clock references, which are selectable as said active reference and have said quality levels, and their selection priorities have been entered; and active reference control means adapted to reference said source priority list for selecting said active reference from said clock references entered into said list, wherein said active reference control means alternatively performs, as specified by a user, either a third mode in which, when the quality level of a clock reference entered into said source priority list and having higher priority than a clock reference that is currently used as said active reference becomes equal to that of said active reference currently used, said clock reference of higher priority is selected as said active reference or a fourth mode in which said active reference remains unchanged.

9. An active reference selecting unit, which is installed in each of transmission units that make up a network to establish network synchronization, for selecting one clock reference from a plurality of clock references received by the corresponding transmission unit as an active reference for controlling the operation of the corresponding transmission unit itself or an active reference for timing supply to an external unit connected to the corresponding transmission unit on the basis of the quality level of each of said clock references presented by a synchronization message received with the corresponding clock reference, comprising:

list storage means for storing a source priority list into which said clock references, which are selectable as said active reference and have said quality levels, and their selection priorities have been entered; and active reference control means adapted to reference said source priority list for selecting said active reference from said clock references entered into said list, wherein said active reference control means performs a control operation of, at the time of execution of an insert command by a user, inserting a specified clock reference in the position of predetermined priority in said source priority list stored in said list storage means and automatically decreasing the priority of each of other clock references of lower priority than said predetermined priority by one position and performs a control operation of, at the time of execution of a delete command by the user, deleting a specified clock reference of predetermined priority from said source priority list and automatically increasing the priority of each of other clock references of lower priority than said predetermined priority of said clock reference deleted by one position.

10. An active reference selecting unit, which is installed in each of transmission units that make up a network to establish network synchronization, for selecting one clock reference from a plurality of clock references received by the corresponding transmission unit as an active reference for controlling the operation of the corresponding transmission unit itself or an active reference for timing supply to an external unit connected to the corresponding transmission unit on the basis of the quality level of each of said clock references presented by a synchronization message received with the corresponding clock reference, comprising:

list storage means for storing a source priority list into which said clock references, which are selectable as said active reference and have said quality levels, and their selection priorities have been entered; and active reference control means adapted to reference said source priority list for selecting said active reference from said clock references entered into said list, wherein said active reference control means performs an operation of, if, at the termination of setup of said source priority list for said active reference used to operate the corresponding transmission unit, a holdover clock produced by the corresponding transmission unit has not been entered into said list, entering said holdover clock into the position of the lowest priority in said source priority list, and, if, at the termination of setup of a source priority list for timing supply for an external unit connected to the corresponding transmission unit, an internal clock that the corresponding transmission unit has not been entered into said list, entering said internal clock into the position of the lowest priority in said source priority list.

11. An active reference selecting method for use in each of transmission units that make up a network to establish network synchronization, for selecting one clock reference from a plurality of clock references received by the corresponding transmission unit as an active reference from controlling the operation of the corresponding transmission unit itself or an active reference for timing supply to an external unit connected to the corresponding transmission unit on the basis of the quality level of each of said clock references presented by a synchronization message received with the corresponding clock reference, comprising the steps of:

using a source priority list into which said clock references, which are selectable as said active reference and have said quality levels and their selection priorities to select each of said clock references have been entered;

selecting the clock reference having the highest quality level in said source priority list as said active reference;

when two or more clock references of the same quality level are entered into said source priority list, selecting a clock reference that is of the highest priority of said clock references of the same quality level as said active reference; and when a clock reference having a quality level higher than that of a clock reference currently selected as said active reference is received and it has been entered into said source priority list, selecting it as said active reference.

* * * * *